3,360,488
ADHESIVE COMPOSITIONS COMPRISING ATACTIC POLYPROPYLENE AND TALL OIL
Lewis W. Hall, Jr., and Jackson S. Boyer, Claymont, Del., and Richard E. Ware, Trainer, Pa., assignors to Sun Oil Company, Philadelphia, Pa., a corporation of New Jersey
No Drawing. Filed May 5, 1965, Ser. No. 453,513
4 Claims. (Cl. 260—23)

This invention relates to hot melt adhesive compositions. In particular, it relates to hot melt adhesive compositions having high performance properties as pressure-sensitive adhesives, which are prepared from low-cost ingredients.

Hot melt adhesives produce a bond in the substrate by simple cooling as distinguished from cross-linking or other chemical reactions. Prior to heating, the adhesives are thermoplastic solid materials. Upon heating, they melt rather sharply and flow freely and are applied to a substrate. The substrate containing the pressure-sensitive adhesive may be applied to other substrates or materials to form a quick wetting, good, pressure-sensitive bond.

The substrates suitable for application of the hot melt composition include paper, cellophane, plastic, textiles, wood and other materials. The substrate containing the pressure-sensitive adhesive may be applied to paper, cellophane, plastic, textiles, wood, glass and other materials to produce a good pressure-sensitive bond.

A pressure-sensitive adhesive must retain a certain amount of tackiness after it has been applied and set on the carrier substrate. This tackiness must be retained for long periods of time, incident to storage and ultimate use. A second property of pressure-sensitive adhesive is high tensile strength. In addition to the desirable properties of the pressure-sensitive adhesive, the melt point, setting time, pot life and general handling qualities of the hot melt compositions in automatic machinery are essential requirements.

We have found that the object of providing a high performance, low-cost, hot melt pressure-sensitive adhesive can be obtained by blending atactic polypropylene and tall oil. The compositions of the invention have excellent properties as pressure-sensitive adhesives. For example, the hot melt compositions can be applied to paper, cellophane or plastic tape, and upon setting, produce tapes containing a pressure-sensitive adhesive. The tapes containing the pressure-sensitive adhesive may be stored in rolls from which the tape is dispensed as needed. The tapes are useful for mending objects such as paper and for closing and sealing containers. The hot melt composition may be applied to packages, such as those made from polypropylene film which may be sealed after filling the package by simply pressing the adhesive containing section of the package against the untreated polypropylene.

Advantageously, the use of hot melt adhesives for pressure-sensitive seals abrogates the need for a solvent which was often necessary with prior adhesives in order to apply them to the substrate.

The atactic (essentially non-crystalline) polypropylene is formed during the stereospecific polymerization of propylene. The polymerization takes place in the presence of a catalyst comprising a coordination complex of a transition metal halide with an organometallic compound. The atactic polypropylene usually represents from about 5 to 15 weight percent of the polymerization product, the remainder being isotactic (essentially crystalline) polypropylene. The solid atactic polypropylene suitable for the composition of the invention has a molecular weight of 15,000 to 60,000 and more particularly from 16,000 to 20,000. It is soluble in boiling pentane, hexane, heptane and other hydrocarbons.

In one known process, the polymerization product in the reaction medium is contacted with a solvent consisting of methanol and water to kill the catalyst. The catalyst is then removed in solution leaving a heptane slurry. The atactic polypropylene is in solution in the heptane, and this solution is removed from the isotactic polymer. The solution is distilled to recover the heptane solvent which is recycled. The solid material which remains is the atactic polypropylene employed in the compositions of this invention. Suitable atactic polypropylene is available commercially, such as "Oletac 100."

TABLE I.—Properties of "Oletac 100" employed

| | |
|---|---|
| Molecular wt. | 16,000 to 20,000 |
| Viscosity cp. at 300° F. | 4,200 to 5,800 |
| Ring and ball ° C. | 115 to 121 |
| Intrinsic viscosity [n] | .28 |

The tall oil suitable for use in the instant invention is that derived in the usual manner by the acidification of the black liquor skimmings of the alkaline paper pulp industry and commercially available such as "Resin SH" or "Indus Oil JC–RO." Any tall oil having an acid number of 155 to 183, a saponification number of 158 to 185 and an iodine number of 143 to 210 is suitable.

Suitable relative amounts of ingredients are from about 75 to about 95 wt. percent atactic polypropylene and from about 5 to 25 wt. percent tall oil.

The following examples are given for illustration of the invention and are not intended to limit its scope.

EXAMPLE I 80 grams of atactic polypropylene containing .8 gram of 2,6-ditert-butyl-4-methyl-phenol (antioxidant) were blended in a Sigma blade mixer with 20 grams of Resin SH, a tall oil, at about 302° F. until a homogeneous melt was obtained. The hot melt was applied to a one inch square area in the center of a 1 x 3 inch strip of 50 pound kraft paper and allowed to cool in a dust-free environment. The adhesive containing strips were then applied to 1 x 3 inch strips of untreated kraft paper, aluminum foil, polypropylene and cellophane and pressure applied by hand to make the bond. The strips were then tested as described below for peel strength and shear strength.

EXAMPLE II

As a comparison, 100 grams of atactic polypropylene containing 1 gram of BHT antioxidant were heated to 250° F. to form a hot melt from which test strips, as in Example I, were prepared and tested.

The test was performed on a Tinius-Olsen tensile tester using a separation rate of two inches per minute.

The peel test is conducted by securing one strip and attaching a pulling arm to one end of the second substrate, so that the second substrate is pulled perpendicular to the adhesive layer. When the tester is activated, it records the grams necessary to cause a failure of the bond at the rate of 2 inches per minute across the one inch (2.5 cm.) width of the adhesive area.

The shear strength is determining by securing one end of one substrate and attaching the opposite end of the other substrate to the pulling arm. When the tester is activated, it records the grams required to shear the one inch (2.5 cm.) square adhesive area along the axis of two bonded strips at the rate of 2 inches per minute. The results of the test are set out below.

Table II

| Substrate to which kraft paper containing adhesive is bonded | Peel Strength, grams/cm. | | Shear Strength, grams/cm.² | |
|---|---|---|---|---|
| | Atactic polypropylene | Atactic polypropylene and Tall oil | Atactic polypropylene | Atactic polypropylene and Tall oil |
| Paper | 0 | 36 | 0 | 471 |
| Aluminum Foil | 36 | 198 | 974 | 889 |
| Polypropylene | 216 | 288 | 444 | 388 |
| Cellophane | 54 | 450 | 546 | 514 |

Another run employing Indus Oil JC-RO as the tall oil gave comparable results with that of Example I.

It is readily apparent that the addition of tall oil in the recited proportions dramatically increases the adhesive properties of atactic polypropylene. The addition of tall oil somewhat diminishes the shear strength but not significantly as compared to increases in peel strength.

It is an interesting property of the hot melt applied pressure-sensitive adhesives of the present invention that the bond between the hot melt and the carrier substrate is much stronger than the pressure-sensative bond, so that if tapes are produced containing the adhesive, they can be stored in rolls without the necessity of treating the uncoated side of the carrier substrate with release compounds.

In addition to atactic polypropylene and tall oil, the compositions may contain such functional ingredients as fillers, plasticizers, antioxidants, tackifiers, solvents, thinners and coloring agents.

The invention claimed is:
1. A thermoplastic hot melt adhesive comprising a homogeneous mixture of a major proportion of atactic polypropylene and a minor proportion of tall oil.
2. A thermoplastic hot melt adhesive comprising a homogeneous mixture of 75 to 95 wt. percent atactic polypropylene and a minor proportion of tall oil.
3. A thermoplastic hot melt adhesive comprising a homogeneous mixture of 75 to 95 wt. percent atactic polypropylene having a molecular weight of 15,000 to 60,000 and tall oil.
4. A thermoplastic hot melt adhesive comprising a homogeneous mixture of 75 to 95 wt. percent atactic polypropylene having a molecular weight of 16,000 to 25,000 and tall oil, said adhesive being characterized as producing a pressure-sensitive bond when a substrate containing said adhesive is applied to another substrate.

References Cited

UNITED STATES PATENTS

| 3,134,759 | 5/1964 | Kirkpatrick et al. | 260—97.5 |
| 3,220,966 | 11/1965 | Flanagan | 260—27 |
| 3,232,895 | 2/1966 | Klein et al. | 260—27 |
| 3,258,340 | 6/1966 | Riboni | 96—87 |
| 3,284,279 | 11/1966 | Rumberger | 161—235 |
| 3,325,562 | 6/1967 | Peterkin | 260—897 |

JAMES A. SEIDLECK, Primary Examiner.

R. A. WHITE, Assistant Examiner.